United States Patent
McCausland et al.

[11] Patent Number: 5,822,410
[45] Date of Patent: Oct. 13, 1998

[54] CHURN AMELIORATION SYSTEM AND METHOD THEREFOR

[76] Inventors: William H. McCausland, 14120 Stonegate Dr.; Richard J. Kehoe, Jr., 10737 Glen Ellen R. Dr., both of Tampa, Fla. 33624; Walter A. Tobin, 9253 123rd Ave. North, Largo, Fla. 34643; John Paredes, 3301 Bayshore Blvd. #308, Tampa, Fla. 33629

[21] Appl. No.: 585,232

[22] Filed: Jan. 11, 1996

[51] Int. Cl.⁶ .................................................. H04M 15/00
[52] U.S. Cl. ........................... 379/111; 379/34; 379/112; 379/201; 379/265
[58] Field of Search .................................. 379/111, 112, 379/114, 115, 201, 265, 211, 197, 230, 207, 92, 93, 216, 266, 309, 355, 267, 242, 243, 245

[56] References Cited

U.S. PATENT DOCUMENTS

| | | | |
|---|---|---|---|
| 4,734,564 | 3/1988 | Boston et al. | 235/380 |
| 5,491,742 | 2/1996 | Harper et al. | 379/201 |
| 5,594,791 | 1/1997 | Szlam et al. | 379/201 |
| 5,615,408 | 3/1997 | Johnson et al. | 455/405 |
| 5,644,619 | 7/1997 | Farris et al. | 379/265 |

*Primary Examiner*—Curtis A. Kuntz
*Assistant Examiner*—Binh K. Tieu
*Attorney, Agent, or Firm*—Leonard C. Suchyta

[57] ABSTRACT

A churn amelioration system (20) supports data feeds from mobile switching centers (32), billing systems (34), and customer service systems (36). The system (20) maintains an extensive database (42) of customer/unit data and of rules which indicate how to interpret the data. A churn history process (68) establishes rules for predicting the likelihood of churn. An administration process (86) establishes action-related and offer-related rules and assigns identified customer/units to selected organization representative user (ORU) in-boxes so that the identified customers may be proactively contacted by the ORUs. The ORUs interactively operate a churn amelioration process (126). The churn amelioration process (126) proactively or reactively identifies a specific customer/unit (128), then calculates churn vulnerability (140) and customer worth (150). The system (20) prompts ORUs with pre-approved potential offers (192) which may be extended to customers. These offers are configured in response to customer worth. The system (20) prompts ORUs with pre-approved potential actions (218) which may be extended to customers. These actions are configured in response to specified potential customer problems.

21 Claims, 9 Drawing Sheets

Fig. 11

Subscriber — Edit — InBox — Administration — Reports — Help

Vulnerability N %

Value

Mobile Unit
- MIN/ESN/Acct:
- Market:
- Group:
- Status:
- Activation:
- Contract Type:
- Contract Exp:
- Model:
- Phone Type:
- Manufacturer:
- Service Length:
- Deact Reason:
- Total CS Calls:

| Subscriber Factor | Score |
|---|---|
| Increased Usage | 12 |
| Decreased Usage | 10 |
| Mobile Unit Age | 9 |
| Dropped Calls | 8 |
| Rate Plan | 8 |
| Miscellaneous | 7 |
| Rate Plan History | 7 |
| Billing Inquiries | 5 |
| Mobile Unit Activation | 5 |
| Fraud History | 4 |
| Billing Problems | 3 |
| Equipment Problems | 3 |
| Contract End | 2 |

Subscriber | Billing History | Actions | Offers | Contact History

- Last Name:
- First Name:
- Address1:
- Address2:
- City:
- State:
- Zip Code:
- Home Phone:
- Work Phone:
- Language:

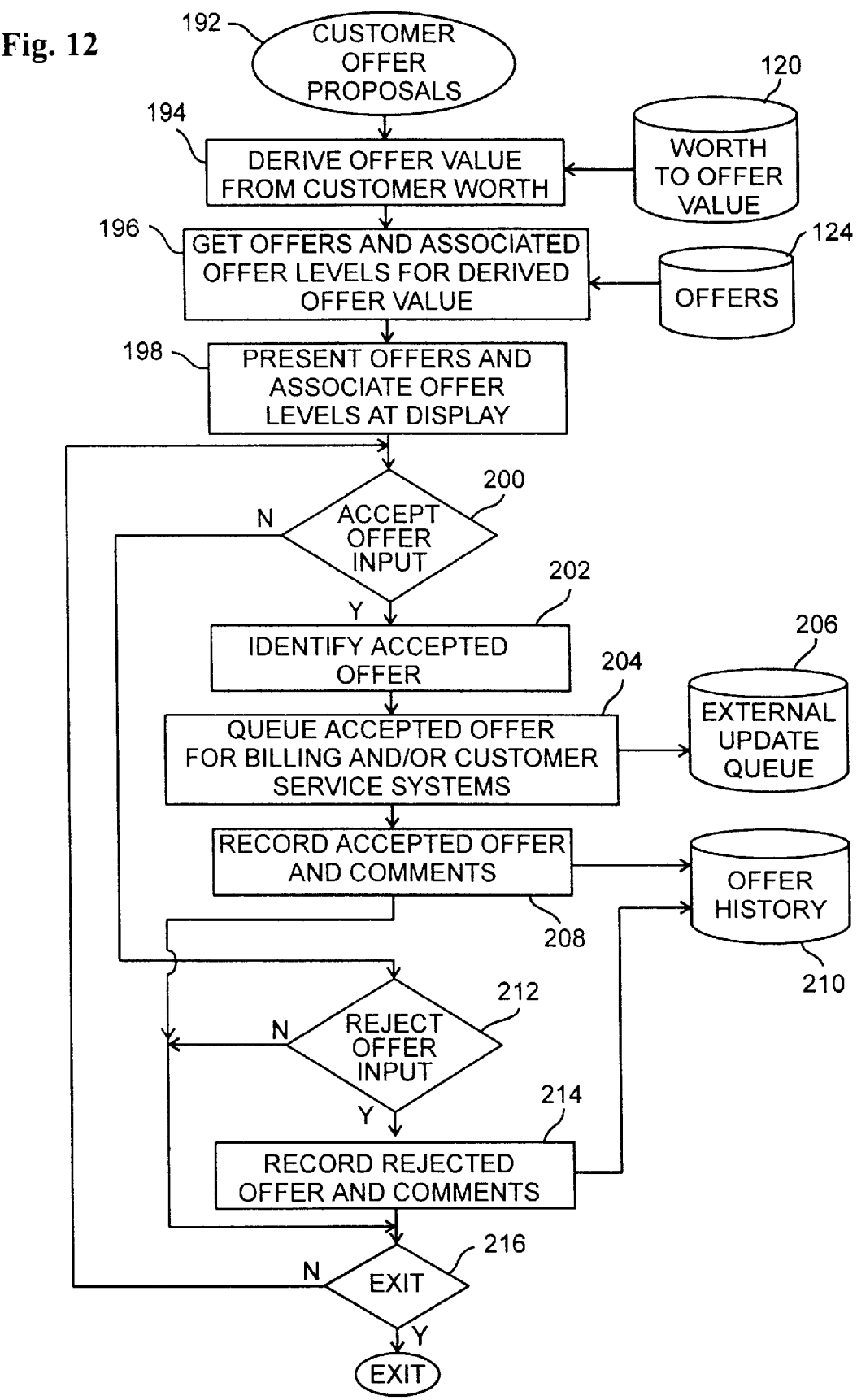

CHURN AMELIORATION SYSTEM AND METHOD THEREFOR

TECHNICAL FIELD OF THE INVENTION

The present invention relates to systems which assist businesses and other organizations in identifying and addressing situations which lead to customer churn.

BACKGROUND OF THE INVENTION

Churn refers to the deactivation of an active customer account. Organizations which provide or deliver information in an environment of significant competition are particularly prone to churn. Such organizations include cellular telecommunication providers, paging service providers, cable television providers, on-line database providers, long-distance telecommunication service providers, and the like. Monthly churn rates in the range of 2% to 5% of an existing customer base are common for cellular service providers. Churn in the cellular industry is both intersystem (caused by customers switching between competing carriers) and industry churn (customers leaving the cellular-marketplace altogether). Increased operational costs result from churn simply due to the expenses incurred in attracting and signing up new customers to maintain or grow the customer base. Replacing churned customers with new ones can still result in lost revenue because average revenue per subscriber tends to decrease with time.

The reasons for churn are many and varied, but an underlying factor is often customer dissatisfaction. The organizations which suffer most from churn tend to offer services based on newer and more complex technologies. Customers are required to master operational equipment complexities and to make decisions regarding complex billing plans and situations. Mismatches between customer needs on one hand and provided features and billing plans on the other are a common source of customer dissatisfaction. Likewise, customer misunderstanding about how equipment and billing plans operate is another common source of customer dissatisfaction. Compared to customers of other organizations, customers of communications and/or information providing organizations may be more willing to take actions, such as changing service providers, when they are not completely satisfied with their service. Accordingly, communications and/or information providing organizations have a need to identify customers having a high potential for situations of dissatisfaction, to identify such customers as quickly as possible, and to propose actions and offers which address such situations.

Conventional systems used in customer service organizations by communications and/or information service providers fail to meet these needs. For example, such systems primarily present billing, trouble tickets, and other customer account information but provide no real analysis of this data. These systems are used reactively in the process of responding to customer calls. Often, organizations direct many more resources toward responding to customer-initiated complaints than to proactively identifying customer-dissatisfying situations before the customer is irritated enough to complain.

Regardless of how a dissatisfied customer is identified, conventional systems do not provide sufficient information to the customer service representatives to enable immediate response in reactive scenarios, or to save teams, which tend to be proactive in nature, to completely identify problems in a timely manner. Consequently, customers may be forced to suffer lengthy wait periods while organization representatives search through diverse systems for information items which may help identify and resolve dissatisfying situations.

Furthermore, organizations have limited human resources to apply to the save team and customer service functions. Typically, an organization's save team is limited to fewer more highly skilled or experienced individuals when compared to the larger customer service organizations. Such individuals are typically empowered to offer monetary incentives on behalf of the organization. Due to their higher skill and expertise level, the organization has confidence that such proposals will not result in a net loss to the organization. By comparison, an organization's customer service representative team is typically composed of many lower skilled or less experienced individuals. Such individuals typically have more limited authority in proposing actions and offers to customers. As a result, the majority of organization representatives that deal with customers are not empowered to do much about keeping customers satisfied.

Proactive customer retention efforts by a save team are recognized to have high value, but the limited save team resources can typically only address a limited portion (i.e. 2%–5%) of a customer base of 100,000–500,000 for a medium to large market. Thus, prioritization of customers for proactive contact is desirable. Unfortunately, conventional systems do not facilitate this prioritization process.

In addition, conventional systems fail to sufficiently account for a customer's worth to an organization. For example, an organization may desire to expend more resources on a mildly dissatisfied but highly valued customer than on a highly dissatisfied customer which has little value to the organization. Likewise, an organization may wish to propose more lucrative offers to highly valued customers than to customers which have little value to the organization. Conventional systems which fail to account for customer worth and/or customer vulnerability to churn cause an organization to misappropriately allocate human resources and to misappropriately respond to potentially dissatisfying situations.

SUMMARY OF THE INVENTION

Accordingly, it is an advantage of the present invention that an improved churn amelioration system and method are provided.

Another advantage of the present invention is that a churn amelioration system and method for tuning offers extended to customers to the worth of those customers are provided.

Another advantage of the present invention is that the set of customers targeted for proactive activities can be prioritized and filtered in response to their worth to the organization, their probability of churning, and/or other factors.

Another advantage of the present invention is that a churn amelioration system and method provide sufficient and timely customer information to support integrated proactive and reactive customer problem resolution and loyalty building activities.

Another advantage of the present invention is that pre-approved offers and actions for proposals to customers are provided to less skilled customer service representatives so that they may be empowered over a wide range of authority to keep customers satisfied.

The above and other advantages of the present invention are carried out in one form by a method of providing customer-related churn amelioration information. The method calls for recording a plurality of customer proposals.

One customer is identified from a multiplicity of customers. The worth of that one customer is quantified. One of the customer proposals is associated with the one customer in response to the worth of the one customer.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 11 shows an exemplary video display terminal screen which presents a customer unit profile;

FIG. 12 shows a flow chart of a customer offer proposals process; and

DETAILED DESCRIPTION OF THE PREFERRED EMBODIMENTS

Figure 1:
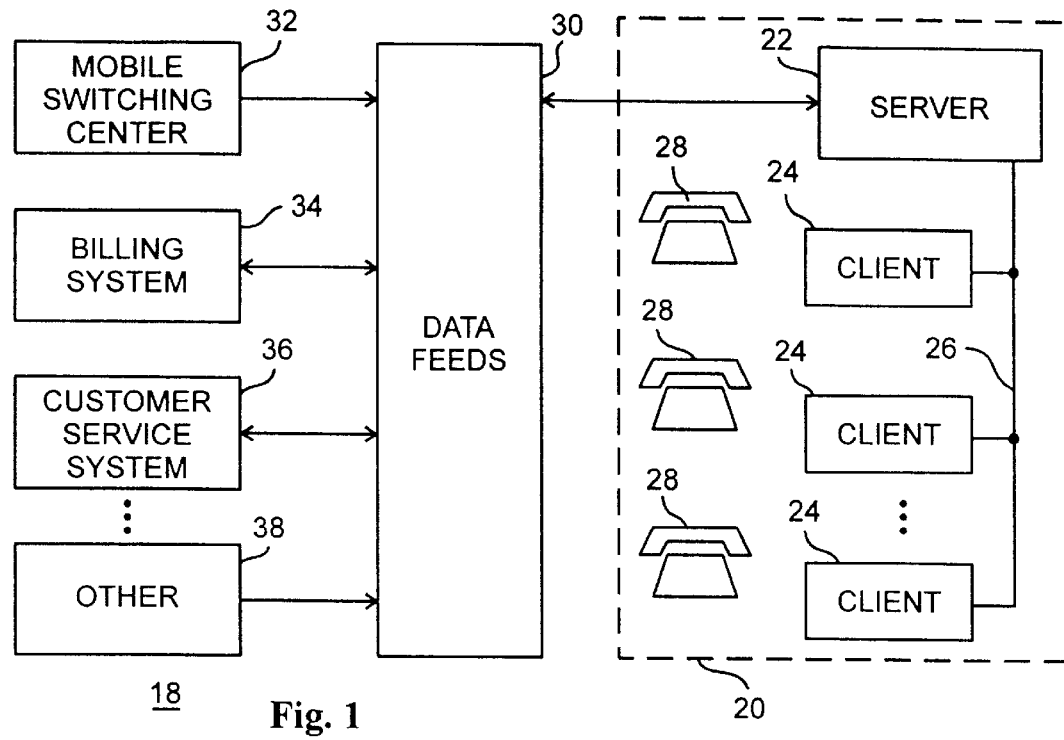
FIG. 1 shows a block diagram of an environment in which a churn amelioration system operates.

FIG. 1 shows a block diagram of an environment 18 in which a churn amelioration system 20 operates. While system 20 may be useful for any organization and particularly for an organization that provides communications and/or information services, such as cellular telecommunication providers, paging service providers, cable television providers, on-line database providers, long-distance telecommunication service providers, and the like, this description focuses on a use of system 20 by a cellular telecommunication provider for the sake of clarity.

System 20 includes a server host computer 22 coupled to any number of client workstations 24 through a local area network 26. Client workstations 24 are operated by administrator users and organization representative users (ORUs). Administrator users, or administrators, are typically supervisors who have an extensive knowledge about environment 18, the organization, the organization's customers in general, and customer equipment. Administrators typically supervise any number, up to hundreds, of ORUs. ORUs include individuals conventionally titled customer service representatives and save team members. ORUs engage in proactive and reactive contact, typically through telephonic devices 28, with the organization's customers. A proactive contact occurs when an ORU initiates contact with a customer, and a reactive contact occurs when a customer initiates contact with an ORU.

Server 22 manages a database (discussed below) of customer-related information. Server 22 receives a portion of its database from administrators and ORUs in the form of user-entered comment information regarding customer contacts. However, the bulk of the database is received through diverse data feeds 30. Data feeds 30 transport data from various data generating and storage facilities, such as a mobile switching center 32, a billing system 34, a customer service system 36, and other systems 38. Other systems 38 may include, for example, a customer activation system and/or additional mobile switching centers 32, billing systems 34 and customer service systems 36. Such systems are well known in the cellular telephony industry as are their counterparts in other information providing industries. Data feeds 30 accommodate streams of on-line data, magnetic tapes, disks, and other conventional data transport media. Such data are received on different schedules depending on the type of data (i.e. billing data are received each billing cycle, switch data are received near real time, etc.).

Mobile switching center 32 provides call detail records (CDRs) using automatic message accounting (AMA) or other conventional call record formats for all calls processed by the mobile switching center 32. Such records detail whether or not calls have been dropped, call durations, feature usage, called parties, and the like. Typically, such records are provided as they are created by switching center 32. Billing system 34 provides customer dossier information, customer equipment or unit identification information, billing plan information, and accounting information, such as monthly billed amounts and amounts currently owed. In addition, billing system 34 provides information indicating when a customer deactivates an account. In other words, billing system 34 provides data indicating specific instances of churn. Customer service system 36 may provide a history of contacts with the customer.

Figure 2:
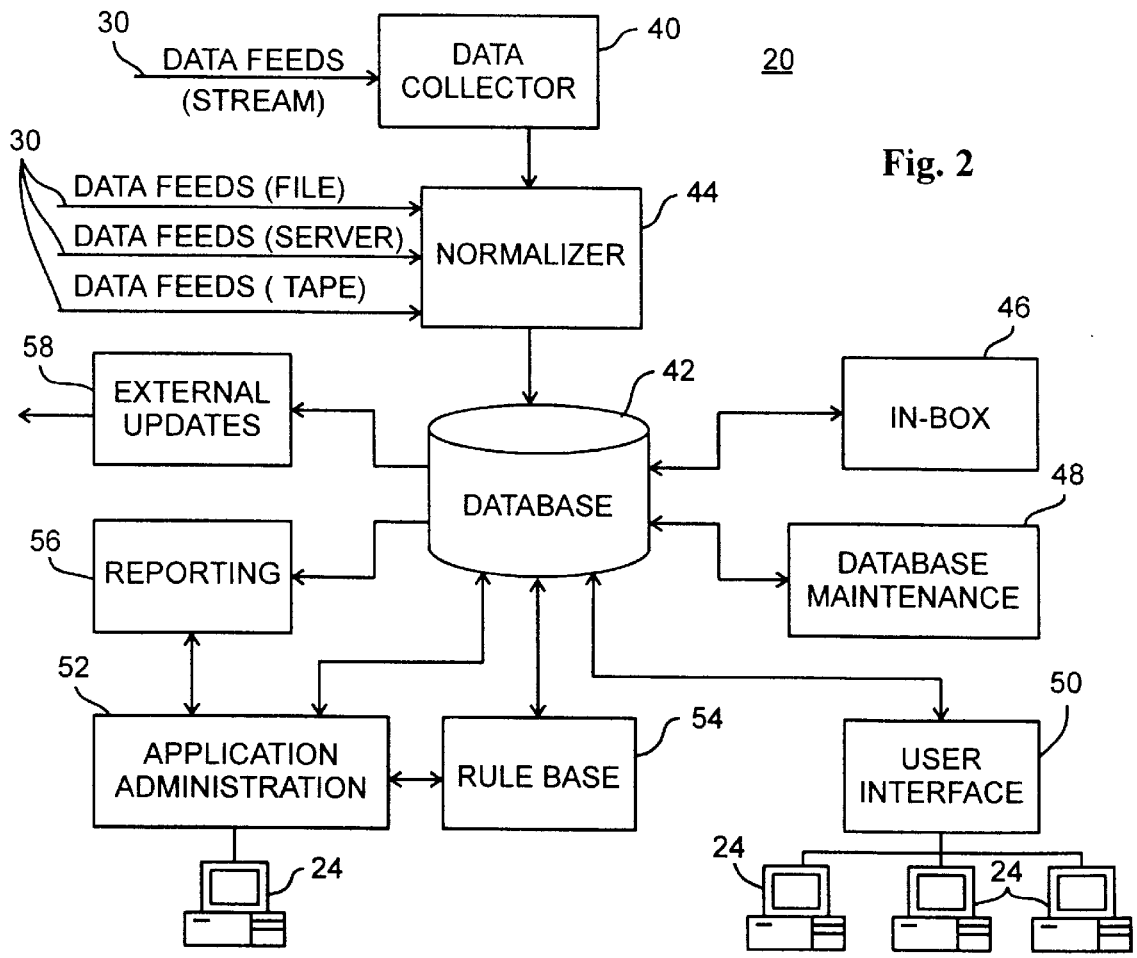
FIG. 2 shows a high level block diagram of software included in the churn amelioration system.

FIG. 2 shows a high level block diagram of software included in system 20. System 20 includes a data collector module 40 which accumulates stream fed data, such as CDR data from mobile switching center 32 (see FIG. 1), until such data can be processed for storage in a database 42. A normalizer module 44 desirably operates in a batch mode during off-peak hours, such as in the night when ORUs are typically not using system 20 to engage in customer contacts. Normalizer 44 translates data feeds 30, either directly or from data collector 40, into consistently formatted data usable by system 20 and causes such data to be stored in database 42. Normalizer 44 need not pass all data it receives on to database 42. Database 42 includes numerous related diverse files, tables, lists, structures, and/or other entities (discussed below) coupled together using conventional relational database techniques.

An in-box module 46 is discussed in more detail below. Generally, module 46 operates with database 42 to identify the specific customers which ORUs should proactively contact to ameliorate churn. A database maintenance module 48 operates on database 42 to perform conventional maintenance tasks, such as purging stale or otherwise invalid data from database 42. A user interface 50 is discussed in more detail below. Generally, interface 50 selects specific data items from database 42 and presents such data items and other data derived therefrom to ORUs for their use during customer contacts. Application administration and rule base modules 52 and 54, respectively, are discussed in more detail below. Generally, modules 52 and 54 together allow administrators to establish the knowledge base rules under which system 20 makes decisions regarding evaluating churn likelihood, customer value, appropriate offers and actions to propose to customers, which customers to proactively contact, and the like.

A reporting module 56 uses conventional database report generating techniques to provide targeted information from database 42 in the form of reports. A wide variety of reports may be generated to monitor the performance of system 20 and of the ORUs. An external updates module 58 provides outgoing data feeds to billing systems and customer service systems 34 and 36, respectively, (see FIG. 1). Outgoing data inform systems 34 and 36 of offers and actions which customers have accepted. In response to this data, systems 34 and 36 may change a customer to a different rate plan, generate customer letters, issue billing credits, and the like.

Figure 3:
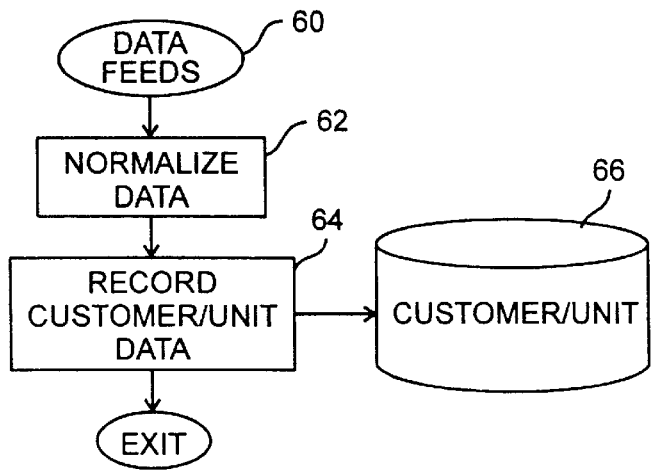
FIG. 3 shows a flow chart of a data feeds process.

FIG. 3 shows a flow chart of a data feeds process 60 performed by system 20, and primarily by normalizer module 44 (see FIG. 2). Desirably, process 60 is performed on a regular schedule, such as nightly, to bring fresh data into database 42 (see FIG. 2). Thus, database 42 contains near real-time data. Moreover, process 60 refrains from degrading the performance of system 20 for ORUs during normal business hours.

Process 60 includes a task 62 which normalizes data received from data feeds 30 (see FIG. 1). The specific type of normalization depends upon the type and format of received data. Task 62 may be individually designed to accommodate specific data feeds from specific sources of data. As a result of task 62, incoming data exhibits a common, known format which is compatible with database 42. This data is called customer/unit data herein. After task 62, a task 64 records the customer/unit data in a customer/unit entity 66 of database 42. After task 64, program control exits process 60 or repeats process 60 (not shown) until all available data have been processed into database 42.

While FIG. 3 and other Figures discussed herein illustrate customer/unit entity 66 and other entities discussed below as single entities for clarity, those skilled in the art may alternatively configure such single entities as combinations of different entities. For example, the preferred embodiment actually configures customer/unit entity 66 as several different entities for billing data, customer-related data, unit-related data, and the like. Generally, customer/unit entity 66 records data associated with specific customers and specific customer units, such as cellular phones. Those skilled in the art will appreciate that a customer may own or otherwise be responsible for many units. Thus, customers-to-units represents a one-to-many relationship. For the sake of clarity, "customer/unit" refers either to a uniquely identified customer regardless of which or how many units may be associated with the customer and to a uniquely identified unit that is associated with a specific customer. Those skilled in the art will appreciate that a cellular phone unit is uniquely identified by the union of the electronic serial number (ESN) and the mobile identification number (MIN). Customers or subscribers may be identified by name, address, MIN or MINs, and the like.

Figure 4:
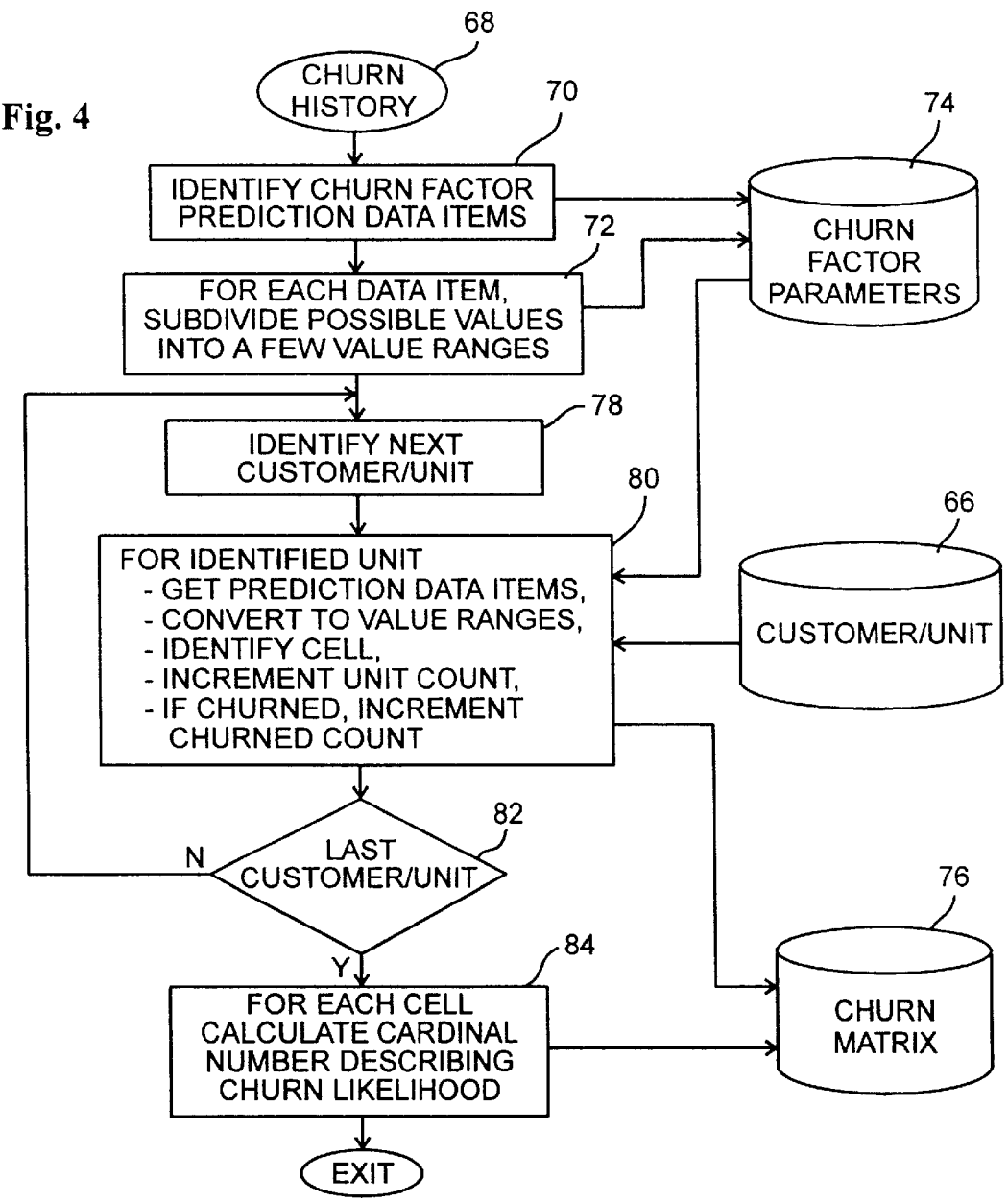
FIG. 4 shows a flow chart of a churn history process.

FIG. 4 shows a flow chart of a churn history process 68 performed by system 20, and primarily by rule base module 54 (see FIG. 2). Desirably, process 68 is performed on a slow regular schedule, such as once a month during off-peak hours, to revise the rules used to predict the likelihood of churn for the customers served by the organization. Generally, process 68 models quantized historical churn factors chosen from the customer/unit data to identify churn rates for each combination of historical churn factor quantum.

Process 68 includes a task 70 which identifies churn factor prediction data items. These data items are categories of data recorded in customer/unit entity 66 or derived from data recorded in customer/unit entity 66. Desirably, only a few churn factors are identified which have strong predictive authority over the churn phenomenon. Table 1 lists example churn factors which a cellular telecommunication provider organization may find to have strong predictive authority over the churn phenomenon. However, different cellular telecommunication markets and providers of other information services may find other churn factors to be predictive.

TABLE 1

Percent of Dropped Calls
Amount of Billing Overdue
Rate Plan
Total Months Of Service
Number Of Customer Service Calls
Months Remaining In Current Contract
Increase In Usage
Decrease In Usage After churn factor data items have been identified in task 70, a task 72 is performed to subdivide the set of possible values for each churn factor into a few value ranges. For example, while a percent of dropped calls churn factor may exhibit a range from 0%–100%, task 72 desirably subdivides this range into a few range sets. Nothing requires any linear, proportional, inversely proportional, or other relationship between churn factor values and range sets.

Task 72 may be performed interactively with an administrator. Tasks 70 and 72 record the identified churn factor data items and their value ranges in a churn factor parameter entity 74 of database 42. Tasks 70 and 72 together define a hypercube memory structure assigned to a churn matrix entity 76 of database 42. The hypercube includes a distinct cell for each possible combination of quanta and churn factor. Desirably, churn factors are restricted and quanta defined so that statistically significant numbers of customer/units fall into most cells when churn factor data values for the entire population of customer/units are evaluated. Each cell has a unit counter and a churned counter (not shown) which are all initially set to a value of zero at task 72.

Following task 72, process 68 evaluates all customer/units described in database 42 one at a time. In particular, a task 78 identifies a next customer/unit to evaluate. After task 78, a task 80 gets the values associated with the prediction data items identified above in task 70 (i.e. churn factors) from customer/unit entity 66 for the identified unit. In addition, task 80 gets data from customer/unit entity 66 indicating whether the specific unit has churned. Task 80 then converts the churn factor values into the appropriate quanta in accordance with the quantizing rules established above in task 72. The quanta for all churn factors taken together address a single cell in the hypercube. The unit counter for this cell is incremented, and if the unit has churned then the churned counter is also incremented. These counts are recorded in churn matrix entity 76.

After task 80, a query task 82 determines whether the last customer/unit described in customer/unit entity 66 has been evaluated. So long as additional customer/units remain to be evaluated, program control loops back to task 78 to assign the next customer/unit to an appropriate cell of the hypercube.

When task 82 determines that all customer/units have been evaluated, an optional task 84 calculates a cardinal number which defines the churn likelihood to be associated with each cell in the hypercube and stores these numbers in the associated cells in churn matrix entity 76. For each cell, the churn likelihood, or vulnerability, number is calculated by dividing the churned count by the units count for that cell. Task 84 is optional at this point in the operation of system 20 because churn matrix 76 may simply retain the churned and unit counts so that churn likelihood may be derived later when needed. After task 84, program control exits process 68.

The calculation of cardinal vulnerability numbers, as opposed to ordinal numbers, is desirable because it allows further calculations and inferences using vulnerability numbers. For example, vulnerability may be multiplied by or otherwise combined with customer worth or value (discussed below) to indicate overall urgency or risk for the organization. Using such a risk factor, for example, the organization can identify and prioritize human resources toward moderately vulnerable but highly valuable customers before less valuable customers which may be more vulnerable. In addition, vulnerability may be evaluated by ORUs to determine in an absolute sense how likely the most vulnerable customer/units and how unlikely the least vulnerable customer/units are to churn.

Figure 5:
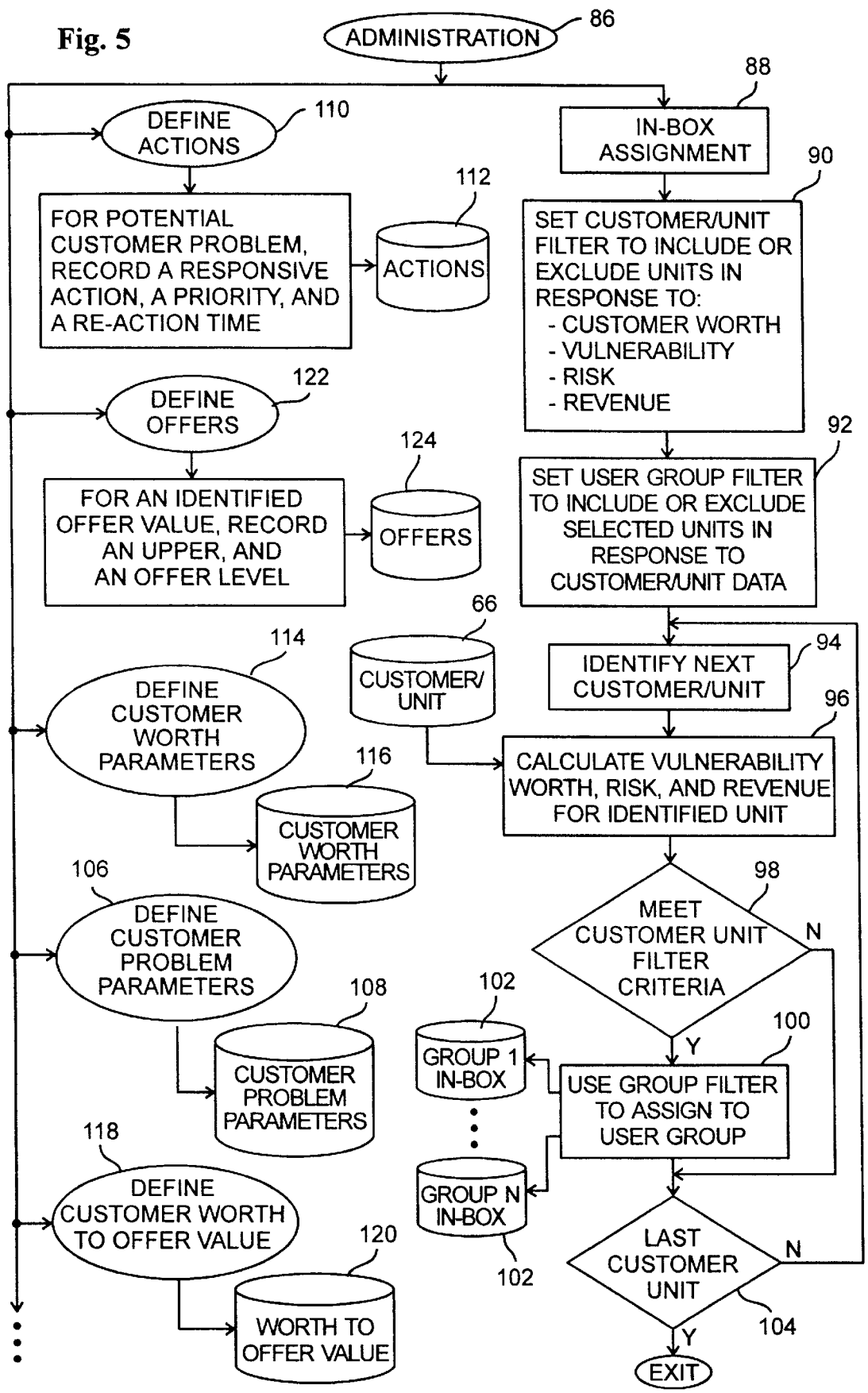
FIG. 5 shows a flow chart of an administration process.

FIG. 5 shows a flow chart of an administration process 86 performed by system 20 and primarily by application administration module 52 (see FIG. 2) on an as-needed basis. Process 86 is performed interactively with an administrator. It is desirable for certain administrative procedures of process 86, such as an in-box assignment procedure 88, to occur during off-peak hours to avoid diminishing the performance of system 20. Each ORU is assigned an In-Box or group of In-Boxes, which contain customer cases for proactive contact. Assignment of cases (customers) to in-boxes occurs daily based on sort and filter criteria set by the administrator. Various procedures of process 86 are performed by system 20 in response to controlling user inputs from keyboard strokes, mouse clicks, and the like.

In-box assignment procedure 88 of process 86 allows the administrator to set criteria to identify specific customers for ORUs to proactively contact and to assign the identified customers to specific ORUs for the contact. In particular a task 90 sets a filter to include and/or exclude customer/units in the selection set based upon customer worth, vulnerability, risk, and/or revenue criteria. Task 90 uses conventional database filtering techniques.

In general, customer worth represents a number associated with a customer in database 42 that defines the worth of the customer to the organization. Customer worth is discussed in more detail below. In general, vulnerability is a number derived from churn matrix entity 76 (see FIG. 4) which predicts the churn likelihood of a specified customer/unit. Risk refers to a combination, by multiplication for example, of customer worth and vulnerability to indicate the risk of churn faced by the organization for a specified customer/unit. For example, customers of equivalent worth to the organization pose different risks if they have different vulnerabilities, and customers of equivalent vulnerabilities pose different risks if they have different customer worth to the organization. Revenue is similar to customer worth but is intended to be based strictly on monetary considerations while customer worth is not so limited.

After task 90 sets the customer/unit filter to identify selected customers, a task 92 sets a user group filter to include or exclude the assignment of the selected customers to various user groups. User groups refer to collections of ORUs. However, nothing requires such groups to have a particular number of ORUs or ORUs to be limited to belong to only one group. For example, organizations may wish to arrange groups according to language capabilities (English, Spanish, French, etc.) of the ORUs. Task 92 uses conventional database filtering techniques and may permit filtering on any data item stored in customer/unit entity 66 of database 42. Thus, for example, customer data in customer/unit entity 66 may identify a language spoken by customers, and task 92 may link such customers to ORUs with compatible language skills.

After task 92, procedure 88 cycles through database 42 to evaluate each customer/unit. In particular, a task 94 identifies a next customer/unit to evaluate. After task 94, a task 96 calculates churn likelihood or vulnerability, customer worth, risk, and revenue parameters for the identified customer/unit. Generally, vulnerability is calculated by identifying the churn factors discussed above in connection with FIG. 4, getting current customer/unit data for the churn factors, translating the customer/unit data into churn factor quanta, and indexing churn matrix entity 76 (see FIG. 4) to obtain a vulnerability number for the identified customer. This calculation is discussed in more detail below as is the calculation of customer worth. Risk is determined by multiplying vulnerability by customer worth. Revenue is determined by evaluating monetary billing system data for the identified customer/unit.

After task 96, a query task 98 determines whether the items calculated in task 96 meet the customer filter criteria established above in task 90. When the filter criteria are met, a task 100 uses the group filter criteria established above in task 92 to assign the customer/unit to an appropriate group in-box entity 102 of database 42. After task 100 and when task 98 determines that an identified customer/unit does not meet customer/unit filter criteria, a query task 104 determines whether the last customer/unit in customer/unit entity 66 has been evaluated yet. So long as additional customer/units remain to be evaluated, program control loops back to task 94. When all customer/units have been evaluated, program control exits procedure 88.

As a result of procedure 88, churn likelihood and customer worth are determined for each customer. Based upon one or more of these parameters, customer/units are automatically distributed among ORUs. As discussed below, the ORUs may, in response to the automatic assignment of customers, proactively contact the customers and propose offers and actions which ameliorate churn.

A define customer problem parameters procedure 106 of process 86 allows an administrator to define potential customer problem factors and parameters related thereto and to store these parameters in a customer problem parameter entity 108 of database 42. Potential customer problems, also called subscriber factors, are data item categories from database 42 or derivable from database 42 that are likely to indicate a problem the customer may be having. Since problems lead to customer dissatisfaction, the customer problem factors are similar to and may include the above-discussed churn factors. However, the customer problem factors are not limited to including all churn factors or to including only churn factors. Potential customer problem factors which a cellular telecommunications provider may find applicable are listed in Table 2. However, different cellular telecommunication markets and providers of other information services may find other potential customer problem factors to be predictive.

TABLE 2

Rate Plan
Mobile Unit Activation
Contract End
Dealer/Sales Agent
Mobile Unit Age
Increased Usage
Decreased Usage
Feature Usage
Customer Service Calls
Billing Problems
Billing Inquiries
Fraud History
Service Quality
Equipment Problems
Dropped Calls As an example, a high level of dropped calls may mean a customer's unit needs an adjustment, and a high level of billing problems may indicate the customer does not understand a billing plan. Each customer problem factor is scored using thresholds set by the system administrator.

A define actions procedure 110 of process 86 allows the administrator to identify specific actions which an ORU may propose to customers on behalf of the organization. When defined through procedure 110, such actions are pre-approved by the administrator. In particular, procedure 110 allows the administrator to record a range of responsive actions for a selected one of the potential customer problem factors identified through procedure 106 along with a priority and a re-action time to associate with that action. The actions and associated priorities are recorded in an actions entity 112 of database 42.

For each potential customer problem factor, procedure 110 allows an administrator to record any number of responsive actions. A responsive action is a specific, targeted solution to address a problem factor that the organization wishes to propose to a customer. In the preferred embodiment, both a short summary description and a more complete full description are recorded. Desirably, when an ORU later reviews a list of actions preapproved for a potential customer problem, several actions will be included in the list. In order to distinguish between the several actions, procedure 110 permits the recording of a priority level in association with the action description. The priority level informs the ORU of which actions to propose first. Typically, actions to propose first are actions which are believed likely to solve a potential problem and/or which are believed to cost the organization the least. The reaction time specifies a default time to allow for the action to take effect. Thus, in-box assignment procedure 88 may exclude customer/units from a list of proactive contact candidates when they have recently been involved in an action that has not yet had a chance to take effect.

A define customer worth parameters procedure 114 of process 86 allows the administrator to identify a plurality of data items that relate to customer worth. In addition, procedure 114 allows the administrator to associate weight and value parameters with customer worth factors. These customer worth parameters are stored in a customer worth parameters entity 116 of database 42. Customer worth factors are data item categories from database 42 or derivable from database 42 that are likely to contribute to the worth of a customer to the organization. Customer worth factors which a cellular telecommunications provider may find applicable are listed in Table 3. However, different telecommunication markets and other information service providers may find other customer worth factors to be useful.

TABLE 3

Feature Revenue
Local Airtime Revenue
Monthly Access Revenue
Local Toll Revenue
Length of Service
Number of Mobile Units
Credit Class
Past Due
Past Due Days
Past Due Amount
Customer VIP status
Non-payment Indicator
Total Airtime Minutes Weight factors define an organization's subjective belief, expressed as a number, concerning the importance of a particular customer worth factor. A range factor normalizes resulting weighted customer worth scores to a common scale.

A define customer worth to offer value procedure 118 of process 86 allows the administrator to construct a worth to offer value entity 120 in database 42. Entity 120 translates between a customer worth number and an offer value number. In the preferred embodiments, customer worth numbers may take a wide range of values. However, offer value numbers are categorized in accordance with a much less precise scale. For example, offer value numbers may be limited to around five or six value levels. Accordingly, procedure 118 allows the administrator to define the relationship between customer worth and offer levels. As a result, ORUs can propose offers having values that are appropriate for the customer's worth.

A define offers procedure 122 of process 86 operates similarly to procedure 110. Procedure 122 allows the administrator to identify specific offers which an ORU may propose to customers on behalf of the organization. By virtue of being defined through procedure 122, such offers are pre-approved by the administrator. In particular, procedure 122 allows the administrator to record offers which are appropriately tuned for a specified customer worth as translated into an offer value level. Offers are recorded in an offers entity 124 of database 42. Offers may be recorded as a textual description of offers to be extended to customers. Desirably, the offers are recorded in association with customer worth. In addition, an offer level may be recorded.

The offer level indicates a precedence, such as good, better or best, associated with offers. Desirably, a plurality of offers are associated with each offer value, and the offers cover a range of offer levels. Nothing prevents an offer from being used in connection with different offer values. For example, a best offer at a low offer value level may be the same offer as a good offer at a higher offer value level.

In operation, ORUs are empowered to extend any offer associated with a specified offer value. However, ORUs are urged to get agreement to lower level offers, such as good level offers as opposed to best level offers, by evaluations based upon the average offer level accepted by customers as defined in feedback from management reports provided by the system. While actions are associated with potential customer problems, offers are associated with customer worth.

Figure 6:
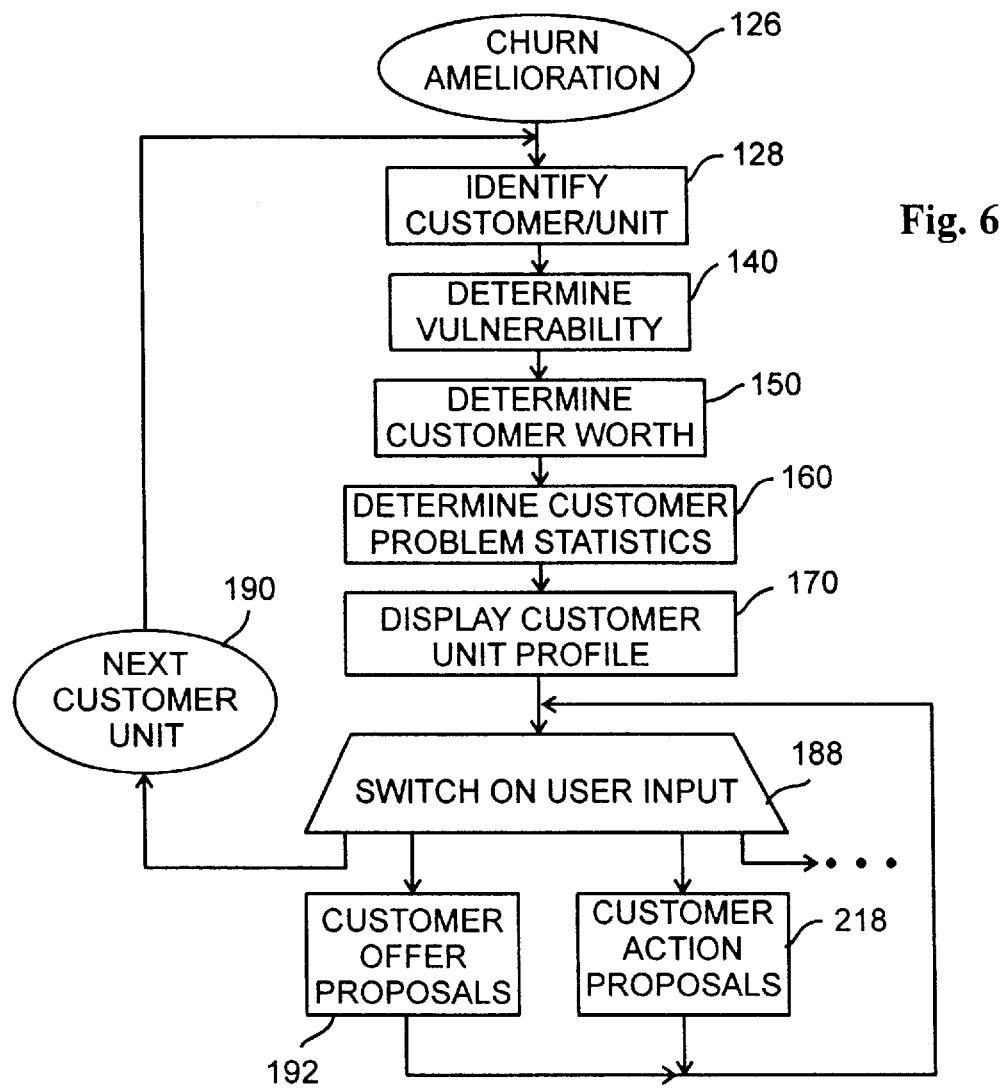
FIG. 6 shows a flow chart of a churn amelioration process.

FIG. 6 shows a flow chart of a churn amelioration process 126 performed by system 20, and primarily by user interface module 50 (see FIG. 2). Desirably, process 126 is performed interactively with ORUs who are reactively and proactively engaging in customer contacts. Generally, process 126 provides the ORU with sufficient information to identify potential churn situations and customer problems and to extend appropriate offer and action proposals to customers on behalf of the organization.

Process 126 is performed when an ORU logs onto system 20 using conventional login and password procedures. Once the ORU has logged onto system 20, churn amelioration process 126 is invoked and assigned to the ORU. Those skilled in the art will appreciate that any number of ORUs may simultaneously be logged onto system 20 and may have process 126 concurrently assigned to them.

Figure 7:
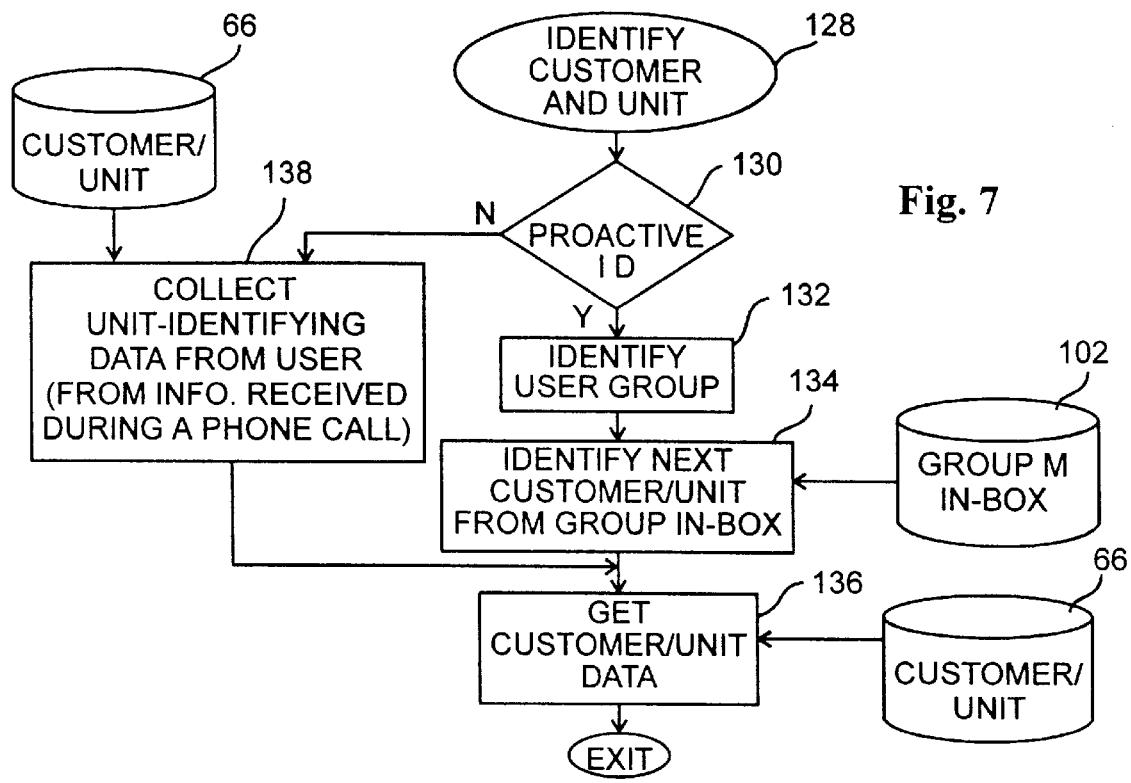
FIG. 7 shows a flow chart of an identify customer and unit process.

Process 126 encompasses many other processes. For example, process 126 includes a process 128 for identifying a customer/unit. Process 128 is discussed in more detail in connection with FIG. 7. Referring to FIG. 7, process 128 includes a query task 130 which determines whether a proactive or reactive customer/unit identification is being requested. A proactive identification may be requested when an ORU clicks or otherwise activates an in-box icon.

When a proactive identification request is detected, a task 132 identifies the user group to which the ORU is assigned. User groups were discussed above in connection with tasks 92 and 100 (see FIG. 5). The user group may be determined through identifying the ORU to whom this instance of process 126 (see FIG. 6) is assigned. After task 132, a task 134 identifies the next customer/unit from the in-box entity 102 for that user group. This customer/unit is then removed from the in-box entity 102. Thus, the identified customer/unit is selected from the customer/units which were previously identified during procedure 88 (see FIG. 5) and assigned to the ORU's user group. As discussed above, procedure 88 permits the previous identification to be based upon one or more of customer worth and churn vulnerability parameters. After task 134, a task 136 gets customer and unit identifying data from customer/unit entity 66. After task 136, program control exits procedure 128.

Referring back to task 130, when no proactive identification request is detected, a reactive identification is implied, and process 128 performs a task 138. In practice, the reactive mode may occur in response to an incoming phone call to customer service from a customer. The ORU may elicit identifying information from the caller and enter such information at the ORU's workstation 24 (see FIG. 1). In a cellular telecommunications application, a MIN represents a typical customer/unit identifier which allows both a unique customer and unit to be easily identified. Once a unique customer/unit has been identified, program control proceeds to task 136, discussed above.

Figure 8:
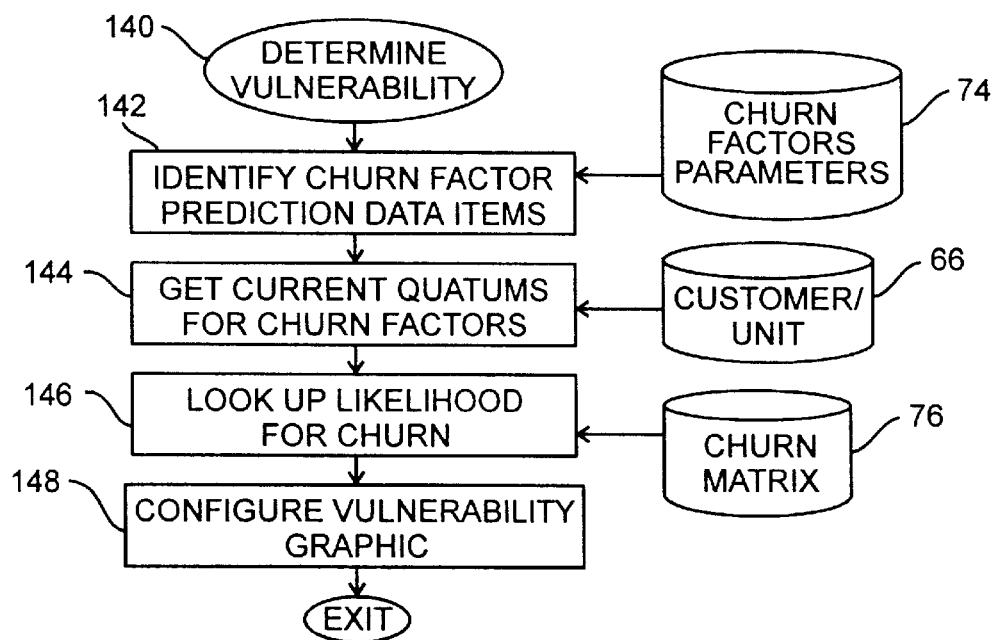
FIG. 8 shows a flow chart of a determine vulnerability process.

As shown in FIG. 6, program control enters a process 140 upon exiting process 128. Process 140 determines vulnerability for the identified customer/unit and is discussed in connection with the flow chart presented in FIG. 8. Referring to FIG. 8, process 140 includes a task 142 which identifies the churn factor prediction parameters discussed above in connection with tasks 70 and 72 (see FIG. 4). These parameters may be obtained from churn factor parameters entity 74. Next, a task 144 uses churn prediction factors to identify the data to extract from customer/unit entity 66 for the customer/unit identified above in process 128 (see FIG. 6). Task 144 also quantizes the churn prediction factor data in accordance with quantization rules obtained from churn factor parameters entity 74. After task 144, a task 146 uses the churn factor quanta to identify a cell within the hypercube structure stored in churn matrix entity 76. From the identified cell, task 146 either extracts or derives the likelihood of churn for this customer/unit, which is also called vulnerability.

After task 146, a task 148 configures a vulnerability graphic in response to the vulnerability determined above in task 146. In the preferred embodiment, this graphic includes from zero to five cherry bomb images where the number of cherry bomb images increase in response to increasing vulnerability. The use of graphic images to present vulnerability and other information is desirable because it helps an ORU to instantly grasp and fully appreciate the vulnerability situation for this customer/unit, which in turn is believed to lead to improved reliability in providing service to the customer. After task 148, program control exits process 140.

Figure 9:
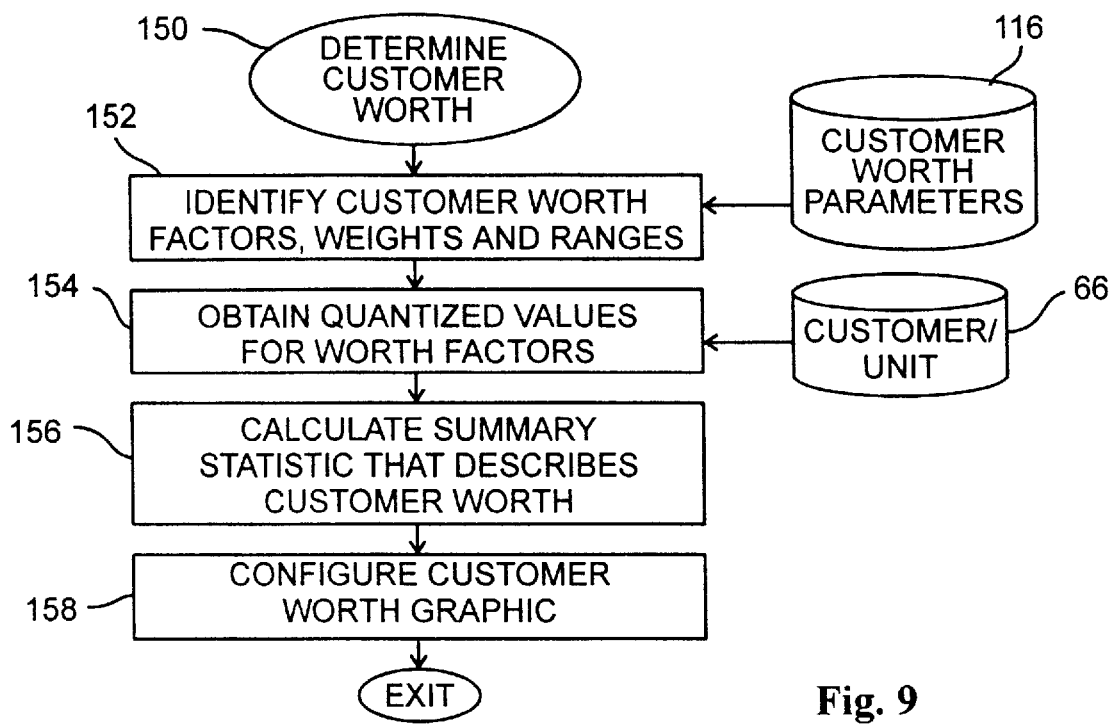
FIG. 9 shows a flow chart of a determine customer worth process.

As shown in FIG. 6, program control enters a process 150 upon exiting process 140. Process 150 determines customer worth for the customer identified above in process 128 and is discussed in connection with the flow chart presented in FIG. 9. Referring to FIG. 9, process 150 includes a task 152 which identifies the customer worth factors, weights, and ranges established by an administrator through the application of procedure 114 (see FIG. 5). Task 152 obtains these factors, weights, and ranges from customer worth parameters entity 116.

Next, a task 154 obtains quantized values for the various customer worth factors. Task 154 obtains these quantized values by extracting data for the customer worth factors for this customer/unit from customer/unit entity 66, and scaling and normalizing in accordance with the weight and range parameters obtained in task 152. After task 154, a task 156 calculates a single summary statistic that describes the customer worth. For example, task 156 may simply sum the quantized values obtained above in task 154. Next, a task 158 configures a customer worth graphic in response to the customer worth summary statistic determined above in task 156. In the preferred embodiment, this graphic includes from zero to five money bag images where the number of money bag images increases in response to increasing customer worth. Program control exits process 150 following task 158.

Figure 10:
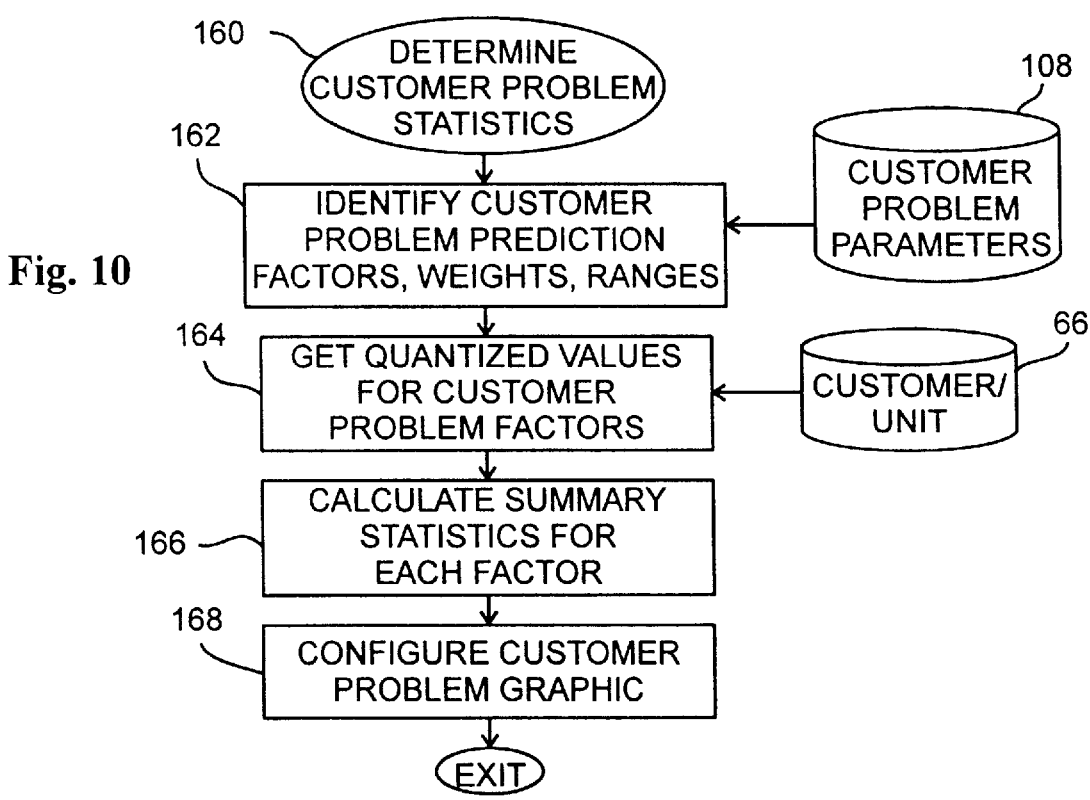
FIG. 10 shows a flow chart of a determine customer problem statistics process.

As shown in FIG. 6, program control enters a process 160 upon exiting process 150. Process 160 determines potential customer problem statistics for the customer/unit identified above in process 128 and is discussed in connection with the flow chart presented in FIG. 10. Referring to FIG. 10, process 160 includes a task 162 which identifies the customer problem prediction factors, weights, and ranges established by an administrator through the application of procedure 106 (see FIG. 5). Task 162 obtains these factors, weights, and ranges from customer problem parameters entity 108.

Next, a task 164 gets quantized values for the various customer problem factors. Task 164 obtains these quantized values by extracting data for the customer problem factors for this customer/unit from customer/unit entity 66 and scaling and normalizing in accordance with the range parameters obtained in task 162. After task 164, a task 166 calculates summary statistics that describe each potential customer problem factor. In the preferred embodiment, task 166 generates a score in the range of 0–5 for each customer problem factor, with a greater score indicating a greater potential problem. Next, a task 168 configures customer problem graphics in response to the customer problem statistics determined above in task 166. In the preferred embodiment, these graphics represent cherry bomb images when the score is greater than a predetermined number, such as two, and no image when the score is less than or equal to the predetermined number. Program control exits process 160 following task 168.

Referring back to FIG. 6, process 126 performs a task 170 following process 160. Task 170 displays a customer unit profile screen 172, shown in FIG. 11, in response to the data obtained in processes 128, 140, 150, and 160 for the identified customer/unit. Referring to FIG. 11, profile screen 172 represents a conventional Windows graphic user interface (GUI) screen which is configured in accordance with the needs of system 20. Those skilled in the art will appreciate that this specific user interface is not a requirement of the present invention.

FIG. 11 illustrates a section 174 of screen 172 which presents unit information, a section 176 which presents vulnerability information both as a number and a graphic object, a section 178 which presents customer worth information (bearing the textual heading "Value") as a graphic, and a section 180 which presents customer problem factors (bearing the textual heading "Subscriber Factor") in association with a summary statistic score and a graphic object when the score is greater than a predetermined value. In addition, FIG. 11 illustrates a tabbed notepad section 182 open to a subscriber page. The subscriber page conveys various items of customer-specific data. Those skilled in the art will appreciate that by activating other tabs of section 182 detailed information related to billing history, actions, offers, and contact history may be displayed in section 182.

By activating an In-Box menu object 184, an ORU may proactively identify a customer/unit. By entering data in unit information section 174 an ORU may reactively identify a customer/unit. Administration processes discussed above in connection with FIGS. 4 and 5 may be accessed through an administration object 186 if the user has an administration level password.

Referring back to FIG. 6, after task 170 displays unit profile screen 172 (see FIG. 11), process 126 remains at a task 188 until a user input is received. User inputs may be received to operate In-Box menu object 184 or enter different unit information in section 174 (see FIG. 11). These inputs cause process 126 to loop back to task 128 as indicated at node 190 and select another customer/unit. As indicated by ellipsis in FIG. 6, any number of switches may be built into unit profile screen 172 to allow an ORU to investigate further details related to the information presented in unit profile screen 172. For example, an ORU may click in section 176 to get additional details related to the vulnerability calculation, section 178 to get additional details related to the customer worth calculation, and section 180 to get additional details related to various potential customer problems.

In addition, an ORU may click the "offers" tab of section 182 (see FIG. 11) to perform a customer offer proposals process 192. Process 192 is discussed in more detail in connection with the flow chart of FIG. 12. Referring to FIG. 12, process 192 includes a task 194, which derives an offer value using the customer worth for this customer/unit. Task 194 derives offer value by performing a table look-up operation using worth to offer value entity 120. After an offer value has been derived, a task 196 gets offers and associated offer levels matched with the offer value identified above in task 194. Task 196 gets the offers and offer levels from offers entity 124. Next, a task 198 presents the offers and associated offer levels to the ORU. Task 198 may make its presentation through a suitable video display terminal screen.

After task 198, a query task 200 determines whether ORU input has been received indicating an acceptance of an offer. In practice, an ORU may read or otherwise discuss the offer with the customer/unit in a phone conversation. This phone conversation may originate with the customer (reactive mode) or the ORU (proactive mode). If the customer agrees to accept the offer, then the ORU may click an "accept" button on the screen or take some like action to indicate that an offer has been accepted.

When task 200 determines that an offer has been accepted, a task 202 identifies the accepted offer. Task 202 may identify a single particular offer by determining which entry from a list of a multiple offers is highlighted or in any other way conventional in the art. After task 202, a task 204 queues the accepted offer for billing and/or customer service systems as appropriate by recording data describing the accepted offer in an external update queue 206 of database 42. At some point in the near future, external updates module 58 (see FIG. 2) will transfer this data to billing system 34 and/or customer service system 36 (see FIG. 1). The nature of the accepted offer dictates where the data is transferred. For example, if an accepted offer is for free air time, then billing system 34 may need to receive data describing the offer to credit airtime to the customer's account. However, if an accepted offer is for a free battery pack, then customer service system 36 may receive the data rather than billing system 34. After task 204, a task 208 records the accepted offer and any relevant comments the ORU may wish to record in an offer history entity 210 of database 42.

Referring back to task 200, when no user input indicating an acceptance of an offer is detected, a query task 212 determines whether any particular offer is indicated as being rejected. Task 212 responds to user input indicating a rejection of the offer. When task 212 detects user input indicating that an offer has been rejected, a task 214 is performed to record the rejected offer along with relevant comments in offer history entity 210. After tasks 208 and 214, a query task 216 determines whether or not to exit process 192. Task 216 responds to user input. If no exiting user input is detected, program control returns to task 200 to await user input. When an exit is requested, program control exits process 192 and returns to task 188, as shown in FIG. 6.

Figure 13:
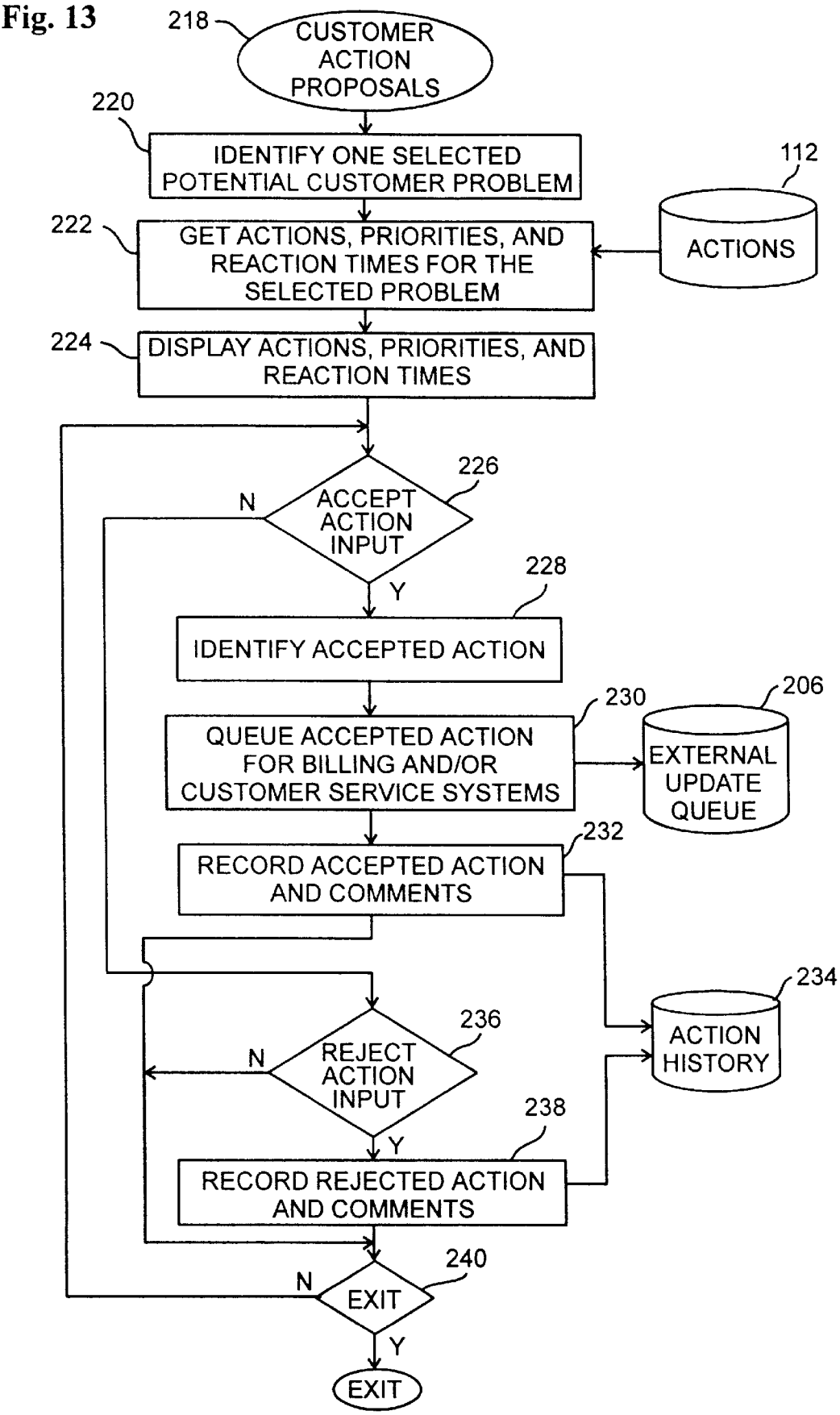
FIG. 13 shows a flow chart of a customer action proposals process.

Referring back to FIG. 6, at task 188 an ORU may click the "actions" tab of section 182 (see FIG. 11) to perform a customer action proposals process 218. Process 218 is discussed in more detail in connection with the flow chart of FIG. 13. Referring to FIG. 13, process 218 includes a task 220, which identifies one selected potential customer problem. In operation, an ORU may select or highlight a particular subscriber factor or potential customer problem from section 180 of screen 172 (see FIG. 11). Typically, an ORU will select a more serious problem as indicated by the summary statistic associated with the listed potential problem or by the graphic associated with the listed potential problem in section 180. Task 220 identifies the problem from this user selection.

After task 220, a task 222 gets actions and associated priorities and reaction times which are associated with the selected potential customer problem in actions entity 112. Next, a task 224 displays the actions and associated priorities and reaction times to the ORU. After task 224, a query task 226 determines whether ORU input has been received indicating an acceptance of an action. In practice, an ORU may read or otherwise discuss a proposed action with the customer in a phone conversation. Desirably, the ORU will begin the discussion with lower priority potential actions.

This phone conversation may be originated by the customer (reactive mode) or by the ORU (proactive mode). If the customer agrees to accept the action, then the ORU may click an "accept" button on the screen.

When task 226 determines that an action has been accepted, a task 228 identifies the accepted action. Task 228 may identify a single particular action by determining which entry from a list of multiple actions is highlighted, or in any other way conventional in the art. After task 228, a task 230 queues the accepted action for billing and/or customer service systems as appropriate by recording data describing the accepted action in external update queue 206 of database 42. At some point in the near future, external updates module 58 (see FIG. 2) will transfer this data to billing system 34 and/or customer service system 36 (see FIG. 1). After task 230, a task 232 records the accepted action and any relevant comments the ORU may wish to record in an action history entity 234 of database 42.

Referring back to task 226, when no user input indicating an acceptance of an action is detected, a query task 236 determines whether any particular action is indicated as rejected. Task 236 responds to user input indicating a rejection of the action. When task 236 detects user input indicating an action has been rejected, a task 238 is performed to record the rejected action along with relevant comments in action history entity 234. After tasks 232 and 238, a query task 240 determines whether to exit process 218. Task 240 responds to user input. If no exiting user input is detected, program control returns to task 226 to await user input. When an exit is requested, program control exits process 218 and returns to task 188, as shown in FIG. 6.

In summary, the present invention provides an improved churn amelioration system and method. The churn amelioration system and method calculate customer vulnerability to churn and/or customer worth and adjust offers extended to customers to the worth of those customers. Customers targeted for proactive activities can be identified and prioritized by their probability of churn and by their worth to the organization. The churn amelioration system and method provide sufficient and timely customer information to support integrated proactive and reactive customer contact activities. Pre-approved offers and actions for proposal to customers are provided to less skilled customer service representatives so that they may be empowered over a wide range of authority to keep customers satisfied.

The present invention has been described above with reference to preferred embodiments. However, those skilled in the art will recognize that changes and modifications may be made in these preferred embodiments without departing from the scope of the present invention. For example, those skilled in the art will appreciate that a wide variation in the categorization of tasks and the sequencing of tasks and in the categorization of data entities and the relationships between the data entities can be devised to accomplish functions equivalent to those discussed above. Those skilled in the art will appreciate that the particular graphics and screen designs may be significantly modified while accomplishing the equivalent of the features discussed herein. These and other changes and modifications which are obvious to those skilled in the art are intended to be included within the scope of the present invention.

What is claimed is:

1. A method of providing customer churn amelioration information, said method comprising the steps of:

a) recording a plurality of customer proposals;

b) modeling churn history in a customer population, to define a customer churn likelihood for combinations of historical quanta and churn factor prediction data items;

c) identifying, for each of a multiplicity of customers, current quanta for said churn factor prediction data items;

d) relating said current quanta with said churn history to predict said customer churn likelihood for each of said multiplicity of customers;

e) identifying one of said multiplicity of customers in response to said predicted customer churn likelihood;

f) quantifying a customer worth for said one customer, said customer worth being responsive to a plurality of customer worth factors determined for said one customer; and g) associating one of said customer proposals with said one customer in response to said customer worth for said one customer.

2. A method as claimed in claim 1 additionally comprising the steps of:

expressing said predicted customer churn likelihoods for said customers as vulnerabilities; and graphically displaying said vulnerabilities at a video display terminal.

3. A method as claimed in claim 1 wherein:

said step e) additionally identifies a second one of said multiplicity of customers, said second customer being identified in response to said predicted customer churn likelihood for said second customer; and said step g) additionally associates a second one of said customer proposals with said second customer in response to said customer worth for said second customer.

4. A method as claimed in claim 1 wherein said churn factor prediction data items include billing data.

5. A method as claimed in claim 1 wherein said step b) comprises the step of calculating a cardinal number which describes said churn likelihood.

6. A method as claimed in claim 1 wherein said step e) identifies said one customer in response to said predicted customer churn likelihood in combination with said customer worth.

7. A method as claimed in claim 1 wherein said step f) comprises the steps of:

identifying a plurality of data items that relate to customer worth;

associating a weight factor with each of said customer worth data items;

for said one customer, obtaining quantized values for said customer worth data items; and for said one customer, calculating a summary statistic in response to said weight factors and said quantized values for said customer, said summary statistic describing said customer worth.

8. A method as claimed in claim 1 wherein said customer proposals are offers and said step g) comprises the steps of:

associating an offer value with each of said offers; and matching said customer worth with one of said offer values to associate said one customer proposal.

9. A method as claimed in claim 1 wherein said customer proposals are offers and said step g) comprises the steps of:

associating an offer value with each of said offers;

presenting said offers having an offer value which matches said customer worth; and receiving information indicating which one of said offers having an offer value matching said customer worth said one customer accepts.

10. A method as claimed in claim 1 additionally comprising the steps of:

identifying a plurality of data items that relate to potential customer problems;

for said one customer, obtaining quantized values for said potential customer problem data items;

calculating a summary statistic for each of said plurality of potential customer problem data items with respect to said one customer; and presenting said summary statistics for said one customer to a user.

11. A method as claimed in claim 10 wherein said customer proposals include offers and actions, and said method additionally comprises the steps of:

associating actions with said potential customer problem data items;

identifying one of said potential customer problem data items; and receiving information indicating which one of said actions associated with said identified potential customer problem data items said one customer accepts.

12. A method as claimed in claim 1 wherein said step f) quantifies customer worth for each of said multiplicity of customers, and said step e) comprises the steps of:

identifying a plurality of customer service representatives;

filtering said multiplicity of customers in response to said customer worth of each customer;

assigning said filtered customers to said customer service representatives; and selecting, through a process assigned to one of said customer service representatives, said one customer front among said filtered customers assigned to said one customer service representative.

13. A method of providing customer churn amelioration information, said method comprising the steps of:

a) modeling churn history in a customer population, to define customer churn likelihoods for combinations of historical quanta and churn factor prediction data items;

b) computing a cardinal number for each of said customer churn likelihoods;

c) identifying, for each of a multiplicity of customers, current quanta for said churn factor prediction data items;

d) relating said current quanta with said churn history to obtain said cardinal number characterizing a predicted customer churn likelihood for each of said multiplicity of customers;

e) recording a plurality of customer proposals;

f) identifying one of said multiplicity of customers in response to said cardinal number for said predicted customer churn likelihood; and g) associating one of said customer proposals with said one customer.

14. A method as claimed in claim 13 wherein said step g) comprises the steps of:

identifying a plurality of data items that relate to potential customer problems;

associating one or more of said customer proposals with each of said potential customer problem data items;

calculating a summary statistic for each of said plurality of potential customer problem data items with respect to each of said customers;

presenting said summary statistics for said one customer to a user;

selecting one of said potential customer problem data items; and receiving information indicating which one of said customer proposals associated with said selected potential customer problem data item said one customer accepts.

15. A method as claimed in claim 13 additionally comprising the step of quantifying a customer worth for each of said multiplicity of customers so that said step f) identifies said one customer in response to said cardinal number for said predicted customer churn likelihood in combination with said customer worth.

16. A method as claimed in claim 15 wherein said customer proposals include offers and said step g) comprises the steps of:

associating an offer value with each of said offers; and matching said customer worth with one of said offer values to associate said one customer proposal.

17. A method as claimed in claim 13 wherein said step f) comprises the steps of:

identifying a plurality of customer service representatives;

filtering said multiplicity of customers in response to at least said predicted customer churn likelihood;

assigning said filtered customers to said customer service representatives; and selecting, through a process assigned to one of said customer service representatives, said one customer from among said filtered customers assigned to said one customer service representative.

18. A method of providing customer churn amelioration information, said method comprising the steps of:

a) predicting a likelihood of customer churn for each of a multiplicity of customers;

b) computing a cardinal number which characterizes said predicted customer churn likelihood for each of said multiplicity of customers;

c) quantifying a customer worth for each of said multiplicity of customers;

d) recording a plurality of customer proposals;

e) filtering said multiplicity of customers in response to at least one of said predicted customer churn likelihood number and said customer worth quantity;

f) identifying a plurality of customer service representatives;

g) assigning said filtered customers to said customer service representatives;

h) selecting, through a process assigned to one of said customer service representatives, one of said customers from among said filtered customers assigned to said one customer service representative; and i) associating one of said customer proposals with said one customer.

19. A method as claimed in claim 18 additionally comprising the step of graphically displaying said customer worth at a video display terminal.

20. A method as claimed in claim 18 additionally comprising the steps of:

expressing said predicted customer churn likelihoods for said customers as vulnerabilities; and graphically displaying said vulnerabilities at a video display terminal.

21. A method as claimed in claim 18 wherein said customer proposals include offers and said step i) comprises the steps of:

associating an offer value with each of said offers; and matching said customer worth for said one customer with one of said offer values to associate said one customer proposal.

* * * * *

UNITED STATES PATENT AND TRADEMARK OFFICE
CERTIFICATE OF CORRECTION

PATENT NO : 5,822,410
DATED : 10/13/98
INVENTOR(S): William H. McCausland et al.

It is certified that error appears in the above-identified patent and that said Letters Patent is hereby corrected as shown below:

Title page, item [73] should be inserted to read:
GTE TELECOMMUNICATION SERVICES, INC.
Tampa, Florida Signed and Sealed this Thirty-first Day of August, 1999

*Attest:*

Q. TODD DICKINSON

*Attesting Officer*  *Acting Commissioner of Patents and Trademarks*